United States Patent [19]
Moon et al.

[11] Patent Number: 6,075,992
[45] Date of Patent: Jun. 13, 2000

[54] APPARATUS AND METHOD FOR AUTOMATICALLY HANDLING INITIATION OF A CALL BY A PORTABLE INTELLIGENT COMMUNICATIONS DEVICE

[75] Inventors: Billy G. Moon, Apex; Manon Baratt, Cary, both of N.C.

[73] Assignee: Ericsson Inc., Research Triangle Park, N.C.

[21] Appl. No.: 08/955,915

[22] Filed: Oct. 22, 1997

[51] Int. Cl.[7] ................................... H04Q 7/20
[52] U.S. Cl. .......................... 455/455; 455/564
[58] Field of Search .................. 455/403, 406, 455/414, 415, 416, 417, 418, 419, 420, 421, 422, 433, 455, 445, 440, 31.3, 38.2, 38.3, 38.4, 343, 564, 565; 379/210, 211, 218, 219, 220, 221; 340/825.44

[56] References Cited

U.S. PATENT DOCUMENTS

| | | | |
|---|---|---|---|
| 5,627,882 | 5/1997 | Chien et al. | 455/464 |
| 5,673,256 | 9/1997 | Maine | 455/427 |
| 5,758,281 | 5/1998 | Emery et al. | 455/428 |
| 5,818,920 | 10/1998 | Rignell et al. | 455/433 |

*Primary Examiner*—Reinhard J. Eisenzopf
*Assistant Examiner*—N. Mehrpour
*Attorney, Agent, or Firm*—Davidson & Gribbell, LLP

[57] ABSTRACT

An apparatus and method of automatically handling initiation of a call by a portable intelligent communications device to a designated recipient, including the steps of determining local time for the designated recipient and determining from the local time whether to permit initiation of the call to the designated recipient. The method also includes the steps of storing time zone information for the designated recipient and calculating from the designated recipient time zone information the local time. Additionally, the method will include the steps of storing at least one phone number for the designated recipient, storing a time range during which said designated recipient may be called at each phone number, and comparing the local time of the designated recipient to the stored time range. If the local time for the designated recipient falls within the time range for one of the stored phone numbers, the call is permitted to be initiated to the designated recipient by the portable intelligent communications device; otherwise, a message is indicated when the local time of the designated recipient is outside the time range for all the designated recipient phone numbers.

22 Claims, 8 Drawing Sheets

APPARATUS AND METHOD FOR AUTOMATICALLY HANDLING INITIATION OF A CALL BY A PORTABLE INTELLIGENT COMMUNICATIONS DEVICE

BACKGROUND OF THE INVENTION

1. Field of the Invention

The present invention relates generally to portable intelligent communications devices and, more particularly, to an apparatus and method for handling initiation of calls by such portable intelligent communications devices.

2. Description of Related Art

A new class of communication devices has been developed which includes a full computer integrated with the communications hardware and software. These devices differ significantly from personal digital assistants (PDAS) and handheld personal computers (HPCs) in that they are designed extensively to be a communications device rather than merely a "mobile computer." As such, the top features for the communications device are telephony, enhanced telephony, messaging, and information services. In order to enable at least some of these features, the portable intelligent communications device is able to be connected to the Internet by either a wired link or a wireless link. It will also be understood that certain software applications are provided within the portable intelligent communications device which facilitate the aforementioned features, as well as other desirable features such as a Personal Information Manager (PIM), games, and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

It will be understood that the aforementioned portable intelligent communications device is targeted to the traveling business person, particularly to one which travels to and calls foreign locations. Due to the change in time zones between and even within countries, it is important for the business person to know the local time for a call's recipient so as to place such a call during the recipient's normal working hours. Since the intended call recipient may also have several phone numbers of which one is best for a particular time range, it is also important to know which phone number to dial during the local time at which the call is initiated. This is also true for call recipients within the same area code as the portable intelligent communications device. While prior solutions to these tasks have involved a caller checking the time zone and calculating the local time for the call recipient from a table to determine the appropriateness of placing the call and/or manually checking a separate table of several possible phone numbers, it would be desirable for an apparatus and method to be developed in a communications device which automates such tasks.

Accordingly, it is a primary object of the present invention to provide an apparatus and method in a portable intelligent communications device for automatically determining the local time of a recipient when initiating a call.

It is another object of the present invention to provide an apparatus and method in a portable intelligent communications device which automatically initiates a call to a recipient depending on the local time of such recipient.

It is still another object of the present invention to provide an apparatus and method in a portable intelligent communications device which automatically provides a prompt for manual initiation of a call to a recipient depending on the local time of such recipient.

Yet another object of the present invention to provide an apparatus and method in a portable intelligent communications device which automatically selects one of a plurality of phone numbers for contacting a call recipient depending on the local time of such recipient.

Still another object of the present invention is to provide an apparatus and method in a portable intelligent communications device which provides a message indicating one of several options when the local time of the call recipient is outside the time range for all stored phone numbers therefor.

These objects and other features of the present invention will become more readily apparent upon reference to the following description when taken in conjunction with the following drawings.

SUMMARY OF THE INVENTION

In accordance with a first aspect of the present invention, a method of automatically handling initiation of a call by a portable intelligent communications device to a designated recipient is disclosed. The method includes the steps of determining local time for the designated recipient and determining from the local time whether to automatically initiate or provide a prompt for manual initiation of the call to the designated recipient. The method also includes the steps of storing time zone information for the designated recipient and calculating from the designated recipient time zone information the local time. Additionally, the method will include the steps of storing at least one phone number for the designated recipient, storing a time range during which said designated recipient may be called at each phone number, and comparing the local time of the designated recipient to the stored time range. If the local time for the designated recipient falls within the time range for one of the stored phone numbers, the call is either automatically initiated to the designated recipient by the portable intelligent communications device or a prompt is provided for manual initiation of the call. Otherwise, a message is indicated when the local time of the designated recipient is outside the time range for all the designated recipient phone numbers.

In accordance with a second aspect of the present invention, a portable intelligent communications device is disclosed as including circuitry for performing telephony operations, a processing circuit, and a database storing information for a plurality of recipients from which a designated recipient is selected to receive a call from the portable intelligent communications device. The processing circuit automatically determines local time for the designated recipient from the stored information in response to a request to initiate the call to the designated recipient. The processing circuit then determines whether to automatically initiate or provide a prompt for manual initiation of the call to the designated recipient depending on the local time determined. This is accomplished by the processing circuit comparing the local time determined for the designated recipient to the time range stored for each phone number during which the designated recipient may be called. When the local time falls within a time range for one of the phone numbers, the processing circuit automatically initiates or provides the prompt for manual initiation of the call to the designated recipient; otherwise, the processing circuit provides a message on a display screen of the portable intelligent communications device.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
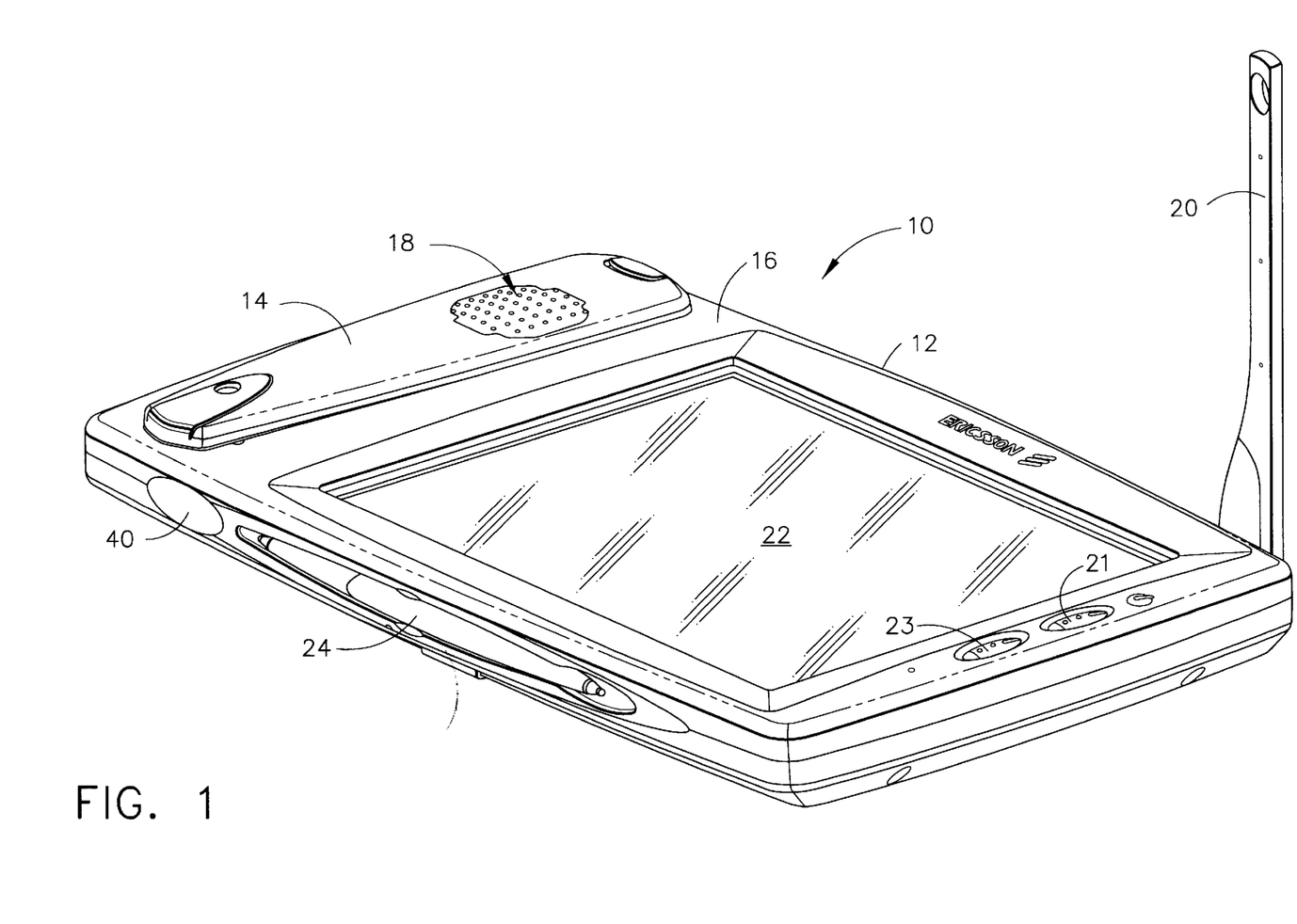
FIG. 1 is a perspective view of a portable intelligent communications device.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device and includes circuitry and components which allows it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to interface software applications with the communications hardware and software. In this regard, it will be understood that portable intelligent communications device 10 generally operates in accordance with a device shown and described in a patent application entitled "Switching Of Analog Signals In Mobile Computing Devices" and having Ser. No. 08/796,119, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained there. A pivotable antenna 20 (shown in FIG. 1 in the open or use position) is provided to enable a communications function, as when portable intelligent communications device 10 is in a cellular mode of operation. It will be understood that various ports, jacks, and interfaces will be provided to further enable communications functions by portable intelligent communications device 10. Control buttons 21 and 23 are also shown as being located on top portion 16 of casing 12.

Portable intelligent communications device 10 further includes a display screen 22, which preferably is a type in which a user of the device is able to interact through touching designated areas thereon. It will be appreciated that a stylus 24 may optionally be utilized to indicate a particular area more specifically than can be accomplished with the user's finger, although most designated areas are sized for touch interaction by a typically sized finger. Since portable intelligent communications device 10 preferably is no larger than a standard business desk telephone, display screen 22 is sized to be approximately eight (8) inches measured diagonally across. This puts screen display 22 in a distinct size class, as it is smaller than normal monitor sizes for personal and portable computers and larger than screen displays for personal digital assistants (PDAs), calculators, and other similar personal electronic devices.

Figure 2:
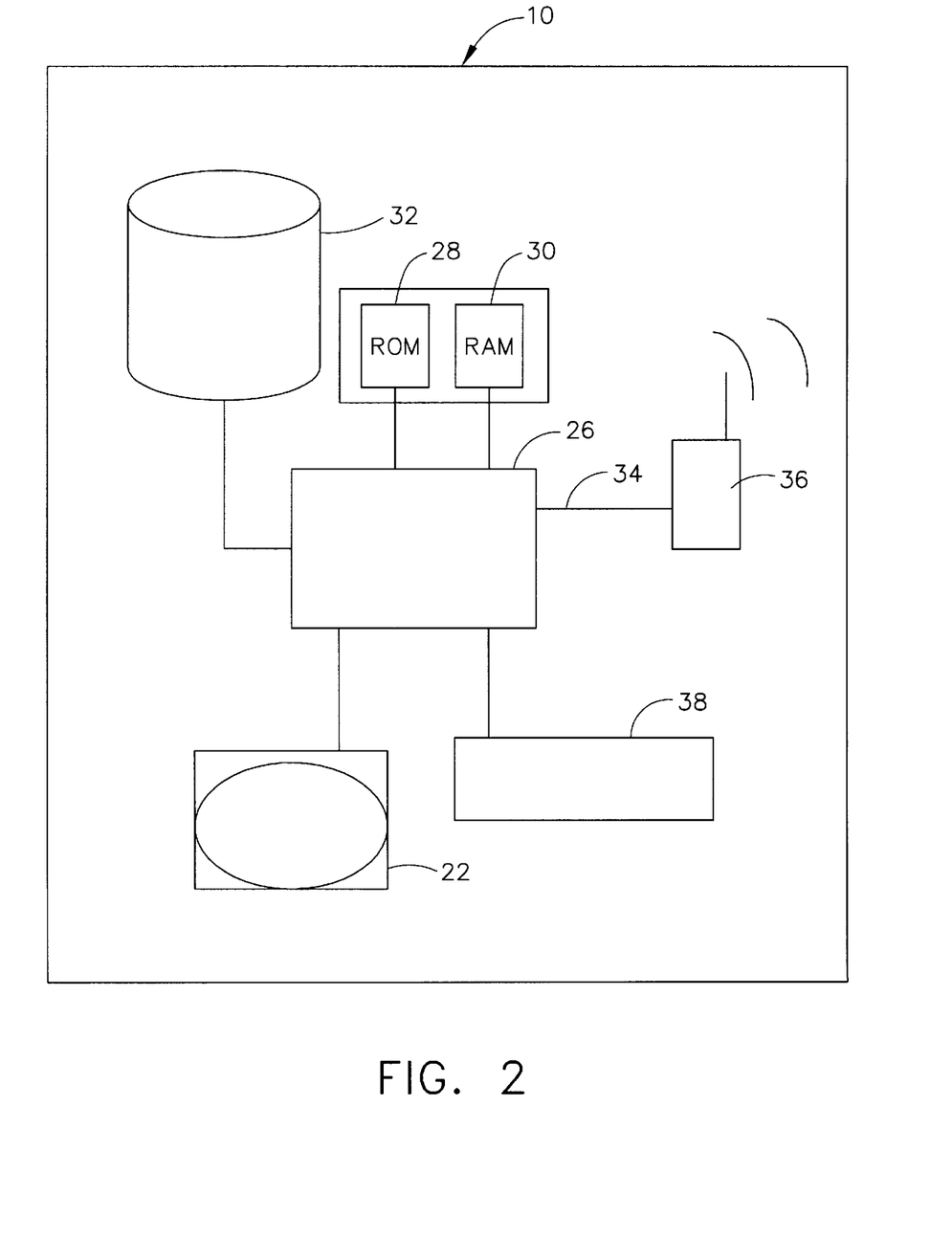
FIG. 2 is a simplified high level block diagram of the portable intelligent communications device depicted in FIG. 1.

Turning to FIG. 2, the internal circuitry of portable intelligent communications device 10 includes a processing circuit 26, which may, for example, be a Motorola microprocessor known by the designation Power PC 821. It will be seen that processing circuit 26 is connected to both Read Only Memory (ROM) 28 and Random Access Memory (RAM) 30 in which both operating systems and software applications are stored. An optional bulk storage device 32 is further provided for storing databases. Processing circuit 26 is also coupled to display screen 22 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 26 via a serial and/or parallel port 34 to the particular circuitry of a communications mode designated generically by reference numeral 36. As noted hereinabove, there are several communication mode options available, including cellular, landline, IrDA, and phone cards, and it will be appreciated that more than one such option may be utilized at a given time. A keyboard 38 may also be connected to processing circuit 26, where keyboard 38 can be depicted on display screen 22 or be a separate physical package which can be utilized with portable intelligent communications device 10 such as through a keyboard IR port 40 (see FIG. 1).

Figure 3:
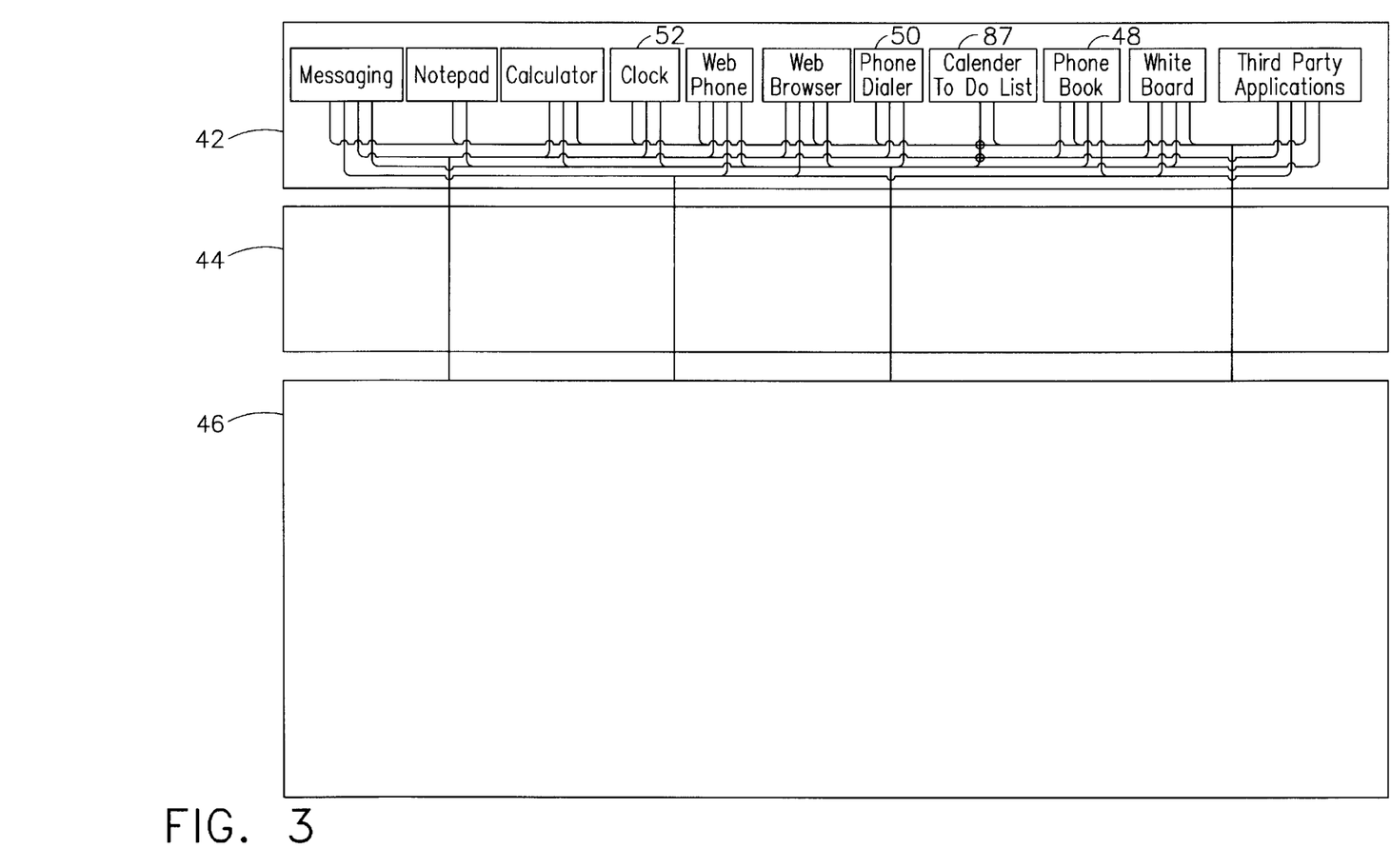
FIG. 3 is a block diagram of the software architecture for the portable intelligent communications device depicted in FIGS. 1 and 2 which includes certain software applications in accordance with the present invention.

FIG. 3 depicts a schematic block diagram of the software architecture for portable intelligent communications device 10. As seen therein, the software is divided into three basic areas: applications software 42, desktop software 44, and system operating software 46 (which includes everything else from the class libraries down to the device drivers for portable intelligent communications device 10). It will be understood that neither applications software 42 nor desktop software 44 will ever interact with anything other than the top layer of system operating software 46. Exemplary software applications are shown within applications software 42, with particular reference being made to phone book software application 48, phone dialer software application 50, and clock software application 52 in light of the present invention.

It will be appreciated that one or more screen displays are provided in which information for a plurality of potential call recipients of portable intelligent communications device 10 are stored in the memory of either ROM 28 or bulk storage device 32. This information is stored in what is typically known as "business card" format, whereby a party's name, address, phone number, and other pertinent information is displayed. Software applications for storing and manipulating such information are well known in the art and generally come under a heading of personal information managers or PIMs. Personal intelligent communications device 10 likewise performs such tasks within applications software 42 and preferably within phone book software application 48.

Figure 4:
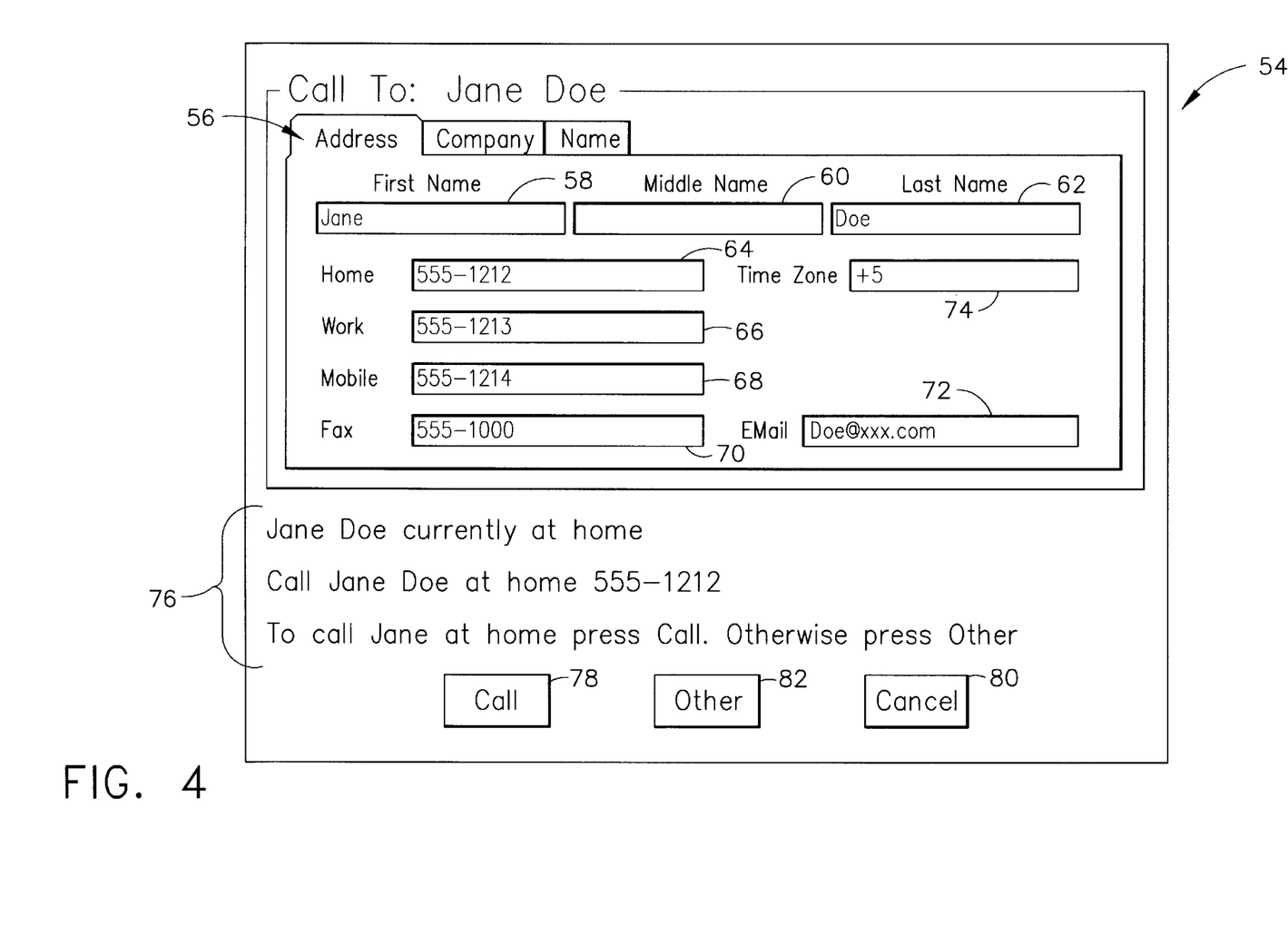
FIG. 4 is a screen display of the phone dialer software application depicted in FIG. 3 operated by the portable intelligent communications device which illustrates a response when a designated recipient is available.

As seen in FIG. 4, a screen display 54 is depicted in accordance with phone dialer software application 50 where a tabbed file 56 with the heading "Address" is shown with separate boxes 58, 60, and 62 being provided for fields relating to a call recipient's first name, middle name, and last name, respectively. Thereafter, separate boxes 64, 66, 68, and 70 are provided so as to list several phone number options for a call recipient's home phone number, work phone number, mobile phone number, and fax number, respectively. Another box 72 optionally is provided to display the call recipient's Email address.

In accordance with the present invention, a separate box 74 is provided within tabbed file 56 to indicate time zone information for the call recipient. It is preferred that box 74 provide the time zone information relative to Greenwich standard time so that local time for the call recipient may be easily calculated therefrom in conjunction with clock software application 52. As seen in the configuration screen display for phone book software application 48 in FIG. 6 and discussed in greater detail hereinafter, separate time ranges may be linked with each phone number stored for a call recipient (see box 118 of FIG. 7). Once a phone call is requested for a designated recipient (box 120), the local time is determined for a designated recipient (box 122). Accordingly, phone dialer application software 50 determines whether to automatically initiate or provide a prompt for manual initiation of a call to such designated recipient and which phone number to contact the call recipient.

Figure 7:
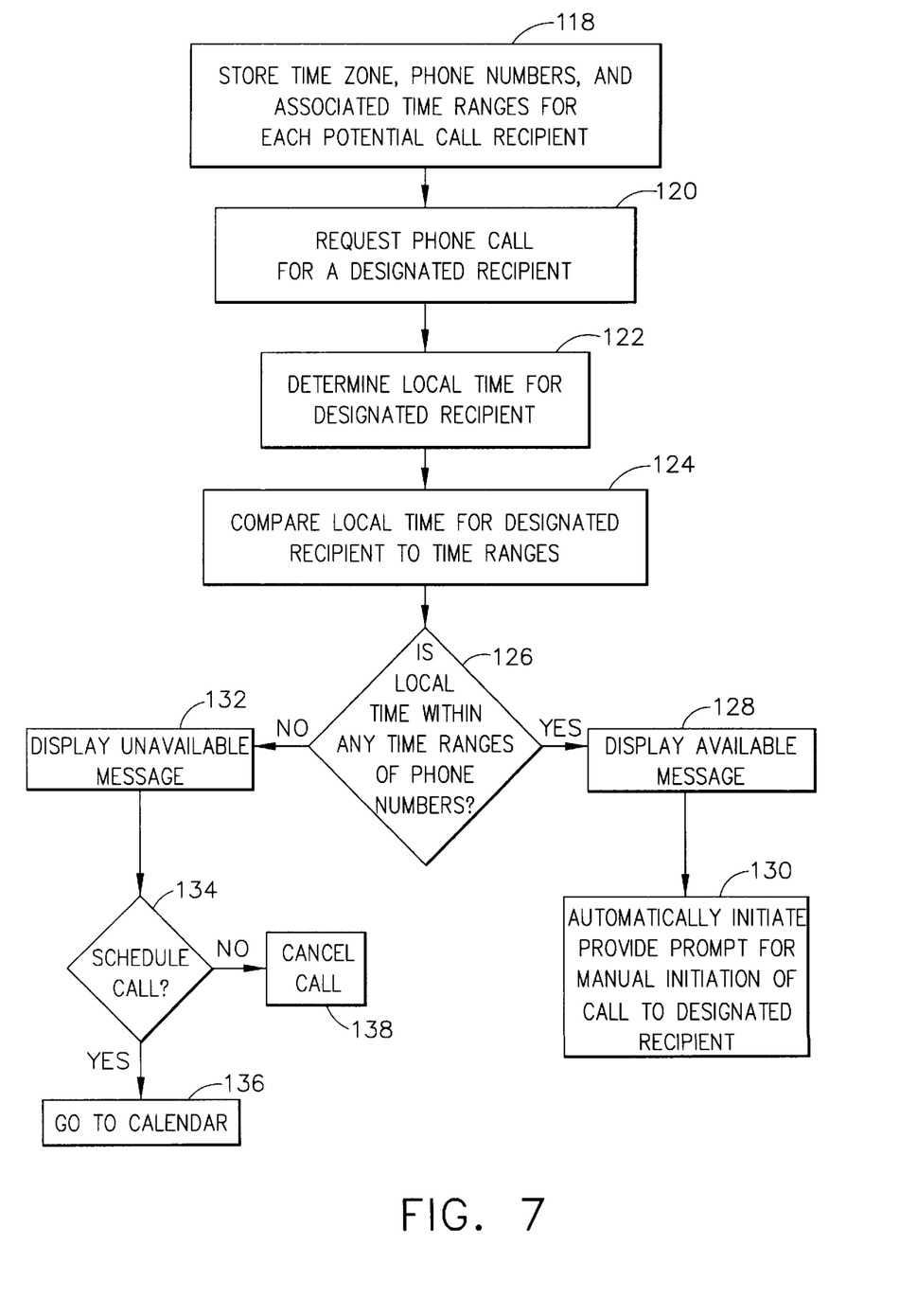
FIG. 7 is a flow diagram of the steps taken by which the method of the present invention is accomplished.

Generally speaking, the logic of phone dialer software application 50 compares the local time calculated for a designated recipient to the time ranges specified for each of the stored phone numbers therefor (box 124) to determine whether the local time for the designated recipient falls within a time range for one of the stored phone numbers (decision box 126). If so, it will be noted that screen display 54 in FIG. 4 provides a message 76 indicating the place where the designated recipient is believed to be according to the corresponding time range and the applicable phone number (box 128). Message 76 may also include instructions as to how to proceed with initiating the call to the designated recipient. Thereafter, processing circuit 26 either automatically initiates the call, or as indicated in message 76, a control button 78 ("Call") is provide which, when activated, manually initiates the call to the designated recipient (box 130). Control buttons 80 and 82 are provided so as to "Cancel" the call request and display "Other" options (e.g., initiate the call on another phone number), respectively. It will be appreciated that even if the call is intended for a recipient within the same area code or time zone, the apparatus and method of the present invention may still be utilized to ascertain which of several phone numbers should be contacted for such call recipient at a given time.

Should the local time determined for the call recipient fall outside the time range for all such stored phone numbers, phone dialer software application 50 will depict a different screen display 84 on display screen 22 of portable intelligent communications device 10 (see FIG. 5) on which one of several available messages 86 will preferably be shown (box 132). Examples of message 86 include initiating the call to the designated recipient at a different phone number and a reminder to initiate the call to the designated recipient during a particular time range, but is not limited thereto. A control button 85 ("Schedule Call") is provided for transferring to a screen display in a calendar/to do software application 87 (decision box 134), where the phone call may be scheduled for initiation at a later time or date in accordance with the time ranges/days in which the designated recipient is available (box 136).

Figure 8:
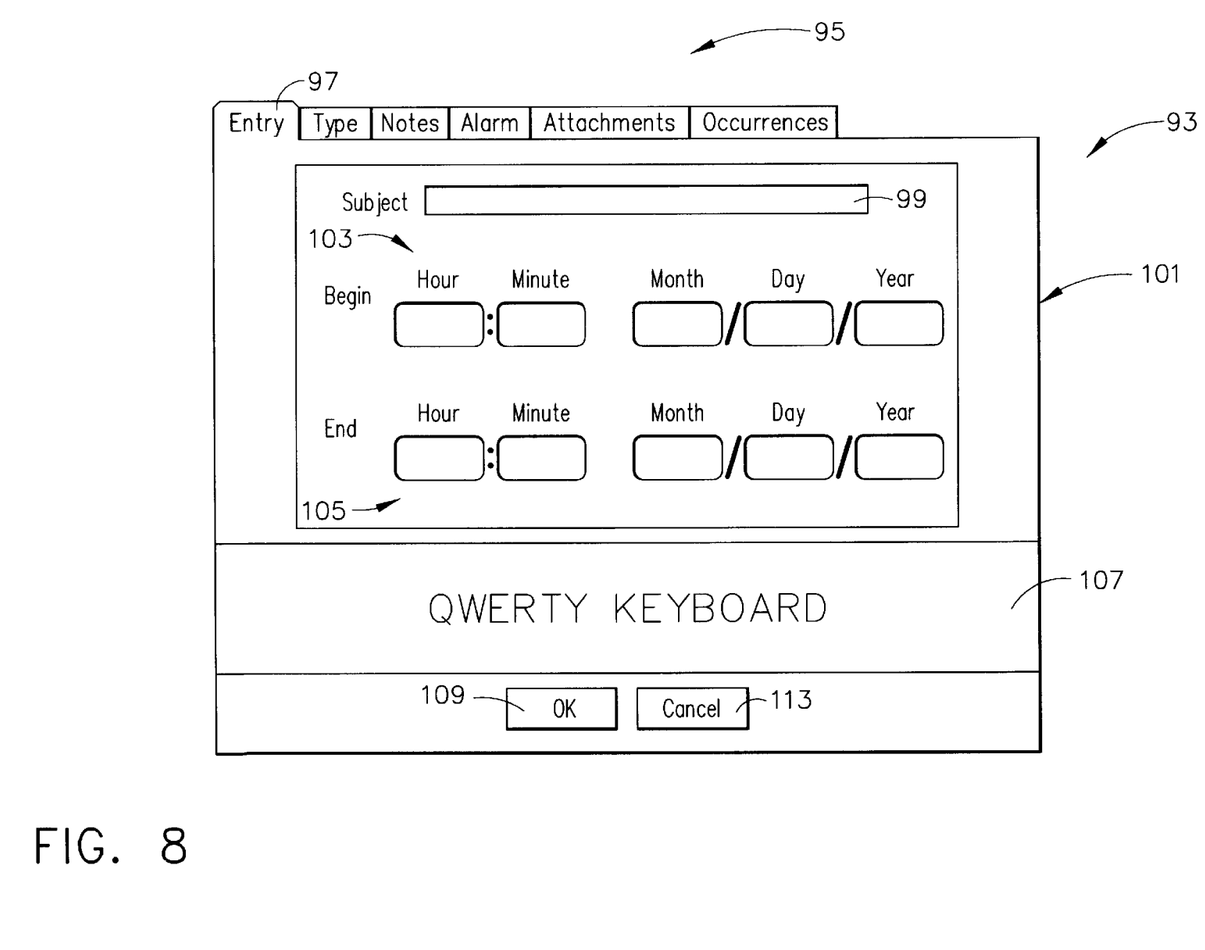
FIG. 8 is a screen display of the calendar/to do software application for scheduling a phone call.

As seen in FIG. 8, a screen display 93 is shown which is obtained within calendar/to do software application 87 to enable scheduling of the phone call. Screen display 93 includes a series of menu tabs (identified collectively by the numeral 95), where Entry tab 97 has been selected. Accordingly, a subject box 99 is provided within a work area 101 for identifying the party of the scheduled call, as are separate fields 103 and 105 for the time (hour and minute) and date (month/day/year) at which the scheduled call is to begin and end, respectively. Preferably, a qwerty-type keyboard is located within a sub-area 107 of work area 101 for inputting the required information. If the information stored in screen display 93 is accurate and the user of portable intelligent communications device 10 still desires to schedule the call accordingly, then an "OK" control button 109 is actuated; otherwise, it can be cancelled via "Cancel" control button 113.

Figure 5:
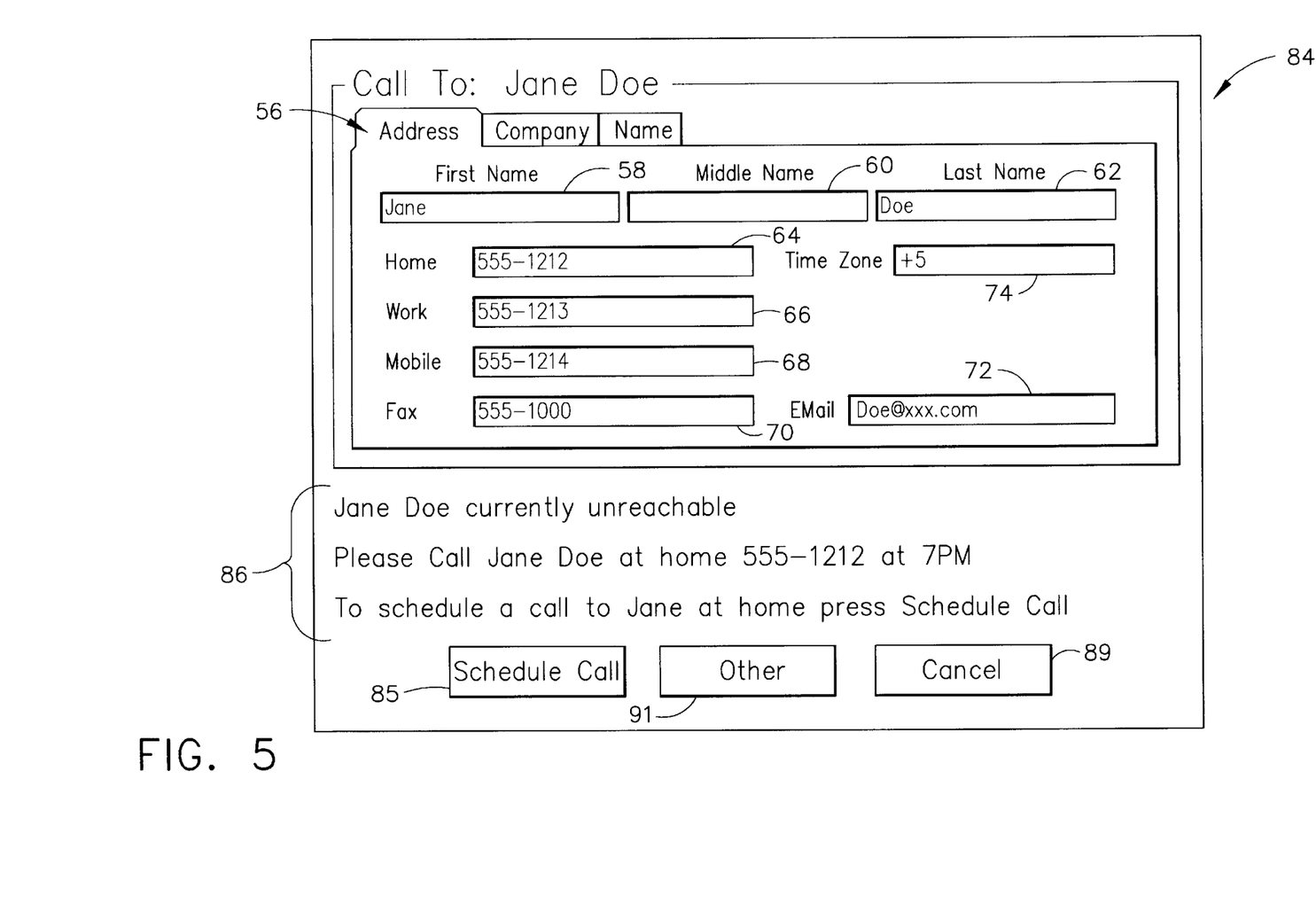
FIG. 5 is a screen display of the phone dialer software application depicted in FIG. 3 operated by the portable intelligent communications device which illustrates a response when a designated recipient is unavailable.

Should the user of portable intelligent communications device 10 desire not to schedule the call, a control button 89 ("Cancel") may be activated to discontinue the phone call (box 138). It is also preferred that a control button 91 ("Other") be provided so that a user of portable intelligent communications device 10 has the option of overriding the process to still manually initiate the call (e.g., so as to leave a voice mail message with the designated recipient). In any event, the purpose of phone dialer software application 50 is to verify whether initiation of a call to a designated recipient should be performed either automatically or manually in light of the local time of such designated recipient and, if so, which one of the stored phone numbers for the designated recipient should be contacted given the associated time range for each.

Figure 6:
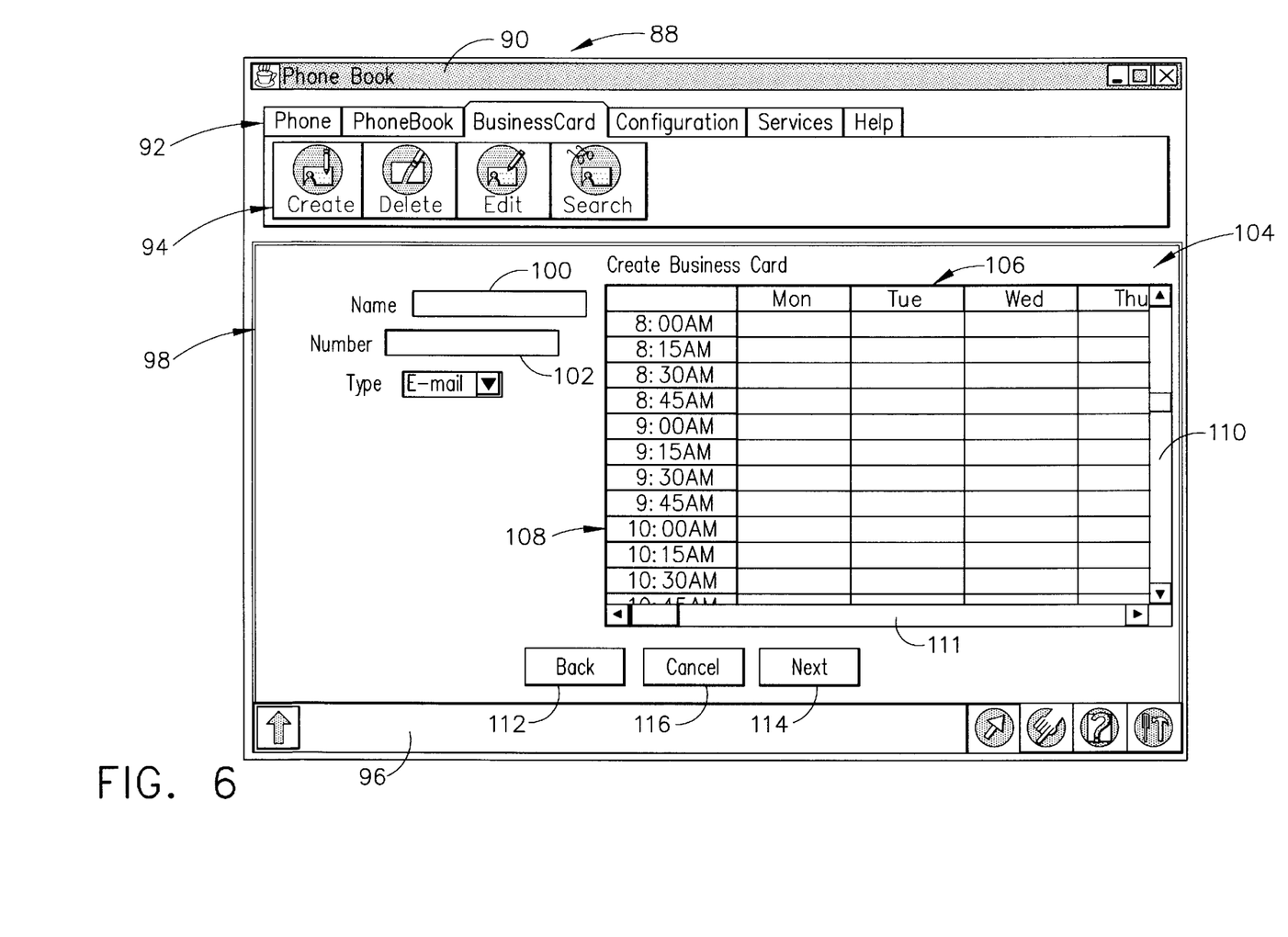
FIG. 6 is a screen display of the phone book software application for configuring the business card information for each entry.

In order to store the available phone numbers and associated time ranges for each potential call recipient within phone book software application 48, a configuration screen 88 is provided as shown in FIG. 6. As seen therein, a title bar 90 is included in a top window, as well as standard control buttons located along the right-hand side of title bar 90. A main control panel 92 is shown as having a plurality of tabbed areas, from which a second level of menu choices or control buttons (identified collectively by the numeral 94), appear after selection of one of the tabs in main control panel 92. A bottom rectangular area 96 of screen display 88 is preferably used to display status information.

It will be further seen that screen display 88 has a window 98 in which separate boxes 100 and 102 are provided for "Name" and "Number," respectively. Additionally, a grid 104 is located within window 98 which is constructed with a top portion 106 designating the days of the week and a side portion 108 designating the hours of a day. A vertical scroll 110 and a horizontal scroll 111 for grid 104 enables a user to make a selection for certain desired times and days, respectively, without having to display all available hours and days. Control buttons 112, 114, and 116 are provided so that a user of portable intelligent communications device 10 is able to manipulate to a previous screen display ("Back"), to a following screen display ("Next"), or to discontinue ("Cancel)," respectively. By entering the time frame for a given phone number within grid 104, phone book software application 48 is able to verify whether such call should be initiated and, if so, to the appropriate phone number.

It will be appreciated that portable intelligent communications device 10 utilizes communications circuitry 36 therein for actually initiating and completing a call to a designated recipient. Before this occurs, however, processing circuit 26 automatically determines through phone dialer software application 50 (in conjunction with phone book application software 48) whether initiation of such call via communications circuitry 36 should take place according to the process described hereinabove.

Having shown and described the preferred embodiment of the present invention, further adaptations of the apparatus and method for handling the placement of a telephone call by a portable intelligent communications device can be accomplished by appropriate modifications by one of ordinary skill in the art without departing from the scope of the invention. In particular, while the apparatus and method of the present invention may be most useful for long distance calls to different time zones, it is also applicable to local calls where a designated recipient has more than one phone number and/or can be contacted at such phone number(s) only during certain days and/or time ranges.

What is claimed is:

1. A method of automatically handling initiation of a call by a portable intelligent communications device to a designated recipient, comprising the following steps:
   (a) storing a plurality of phone numbers for said designated recipient;
   (b) storing a time range during which said designated recipient may be called at each phone number;
   (c) determining local time for said designated recipient; and
   (d) determining from said local time which phone number to use for initiating said call to said designated recipient.

2. The method of claim 1, said local time determining step further comprising the following steps:
   (a) storing time zone information for said designated recipient; and
   (b) calculating said local time from said designated recipient time zone information.

3. The method of claim 2, wherein said time zone information is stored relative to Greenwich standard time.

4. The method of claim 1, further comprising the step of comparing said local time of said designated recipient to said stored time range.

5. The method of claim 4, further comprising the step of automatically initiating said call to said designated recipient at the phone number for which said local time falls within said time range.

6. The method of claim 4, further comprising the step of providing a prompt for manually initiating said call to said designated recipient at the phone number for which said local time falls within said time range.

7. The method of claim 4, further comprising the step of providing a message indicating said designated recipient is available.

8. The method of claim 4, further comprising the step of providing a message indicating said designated recipient is unavailable.

9. The method of claim 8, wherein said message indicates an option of initiating said call to said designated recipient at a different phone number.

10. The method of claim 8, wherein said message indicates a reminder to initiate said call to said designated recipient during a particular time range.

11. The method of claim 8, further comprising the step of scheduling the call to said designated recipient during a particular time range.

12. A portable intelligent communications device, comprising:
   (a) circuitry for performing telephony operations;
   (b) a processing circuit; and
   (c) a database storing information for a plurality of recipients of a call from said portable intelligent communications device, said information including a plurality of phone numbers for each recipient, a time range during which said recipient may be called at each said phone number, and a time zone for each recipient;
   wherein said processing circuit automatically determines local time for a designated recipient from said stored information and which phone number to use in response to a request to initiate a call to said designated recipient.

13. The portable intelligent communications device of claim 12, wherein said processing circuit further determines whether to initiate said call to said designated recipient depending on the local time determined.

14. The portable intelligent communications device of claim 12, wherein said time zone information is stored relative to Greenwich standard time.

15. The portable intelligent communications device of claim 12, wherein said processing circuit compares the local time determined for said designated recipient to said time range for each phone number.

16. The portable intelligent communications device of claim 15, wherein said processing circuit automatically initiates said call to said designated recipient when said local time falls within a time range for one of said phone numbers.

17. The portable intelligent communications device of claim 15, wherein said processing circuit provides a prompt on a display screen of said portable intelligent communications device for manual initiation of said call to said designated recipient when said local time falls within a time range for one of said phone numbers.

18. The portable intelligent communications device of claim 15, wherein said processing circuit provides a message on a display screen of said portable intelligent communications device that said designated recipient is available.

19. The portable intelligent communications device of claim 15, wherein said processing circuit provides a message on a display screen of said portable intelligent communications device that said designated recipient is not available.

20. The portable intelligent communications device of claim 19, wherein said message indicates an option of initiating said call to said designated recipient at a different phone number.

21. The portable intelligent communications device of claim 19, wherein said message indicates a reminder to initiate said call to said designated recipient during a particular time range.

22. The portable intelligent communications device of claim 19, wherein said processing circuit permits scheduling said call to said designated recipient during a particular time range.

* * * * *